United States Patent
Foster et al.

(10) Patent No.: US 10,662,086 B2
(45) Date of Patent: May 26, 2020

(54) PLASMA WATER PURIFIER HAVING PACKED BED DISCHARGES WITH WATER DIELECTRIC BARRIERS

(71) Applicant: THE REGENTS OF THE UNIVERSITY OF MICHIGAN, Ann Arbor, MI (US)

(72) Inventors: John E. Foster, Ann Arbor, MI (US); Selman Mujovic, Jamaica, NY (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 193 days.

(21) Appl. No.: 15/577,478

(22) PCT Filed: May 27, 2016

(86) PCT No.: PCT/US2016/034688
§ 371 (c)(1),
(2) Date: Nov. 28, 2017

(87) PCT Pub. No.: WO2016/191696
PCT Pub. Date: Dec. 1, 2016

(65) Prior Publication Data
US 2018/0148353 A1 May 31, 2018

Related U.S. Application Data

(60) Provisional application No. 62/167,589, filed on May 28, 2015.

(51) Int. Cl.
*C02F 1/32* (2006.01)
*C02F 1/46* (2006.01)
(Continued)

(52) U.S. Cl.
CPC .............. *C02F 1/4608* (2013.01); *C02F 1/72* (2013.01); *C02F 1/32* (2013.01); *C02F 1/722* (2013.01);
(Continued)

(58) Field of Classification Search
CPC .. C02F 1/4608; C02F 1/72; C02F 1/32; C02F 1/722; C02F 1/78; C02F 2101/308; C02F 2201/007; C02F 2305/023; C02F 2201/46
See application file for complete search history.

(56) References Cited

U.S. PATENT DOCUMENTS

| 5,685,994 A | 11/1997 | Johnson |
| 6,187,206 B1 | 2/2001 | Bernier et al. |

(Continued)

FOREIGN PATENT DOCUMENTS

| CN | 101254960 A | 9/2008 |
| CN | 102897892 B | 10/2013 |
| WO | 2013/081300 A1 | 6/2013 |

OTHER PUBLICATIONS

International Search Report and Written Opinion of the International Searching Authority issued in PCT/US2016/034688, dated Sep. 12, 2016; ISA/KR.

*Primary Examiner* — Cameron J Allen
(74) *Attorney, Agent, or Firm* — Harness, Dickey & Pierce, P.L.C.

(57) ABSTRACT

A system for water purification having a water inlet being distributed into a plurality of streams defining extended dielectric barrier layers with high surface area to volume ratios and a plasma disposed between at least a pair of the plurality of water streams forming a surface plasma attachment producing radicals that treat the water via diffusion.

18 Claims, 9 Drawing Sheets

(51) Int. Cl.
*C02F 1/72* (2006.01)
*C02F 101/30* (2006.01)
*C02F 1/78* (2006.01)

(52) U.S. Cl.
CPC .......... *C02F 1/78* (2013.01); *C02F 2101/308* (2013.01); *C02F 2201/007* (2013.01); *C02F 2201/46* (2013.01); *C02F 2305/023* (2013.01)

(56) References Cited

U.S. PATENT DOCUMENTS

| | | |
|---|---|---|
| 6,228,266 B1 | 5/2001 | Shim |
| 8,945,353 B1 | 2/2015 | Fraim et al. |
| 2005/0189278 A1 | 9/2005 | Iijima et al. |
| 2010/0193419 A1 | 8/2010 | Yan et al. |
| 2014/0069853 A1* | 3/2014 | Lee ........................ C02F 1/4672 210/149 |
| 2014/0246364 A1 | 9/2014 | Hruska et al. |

* cited by examiner

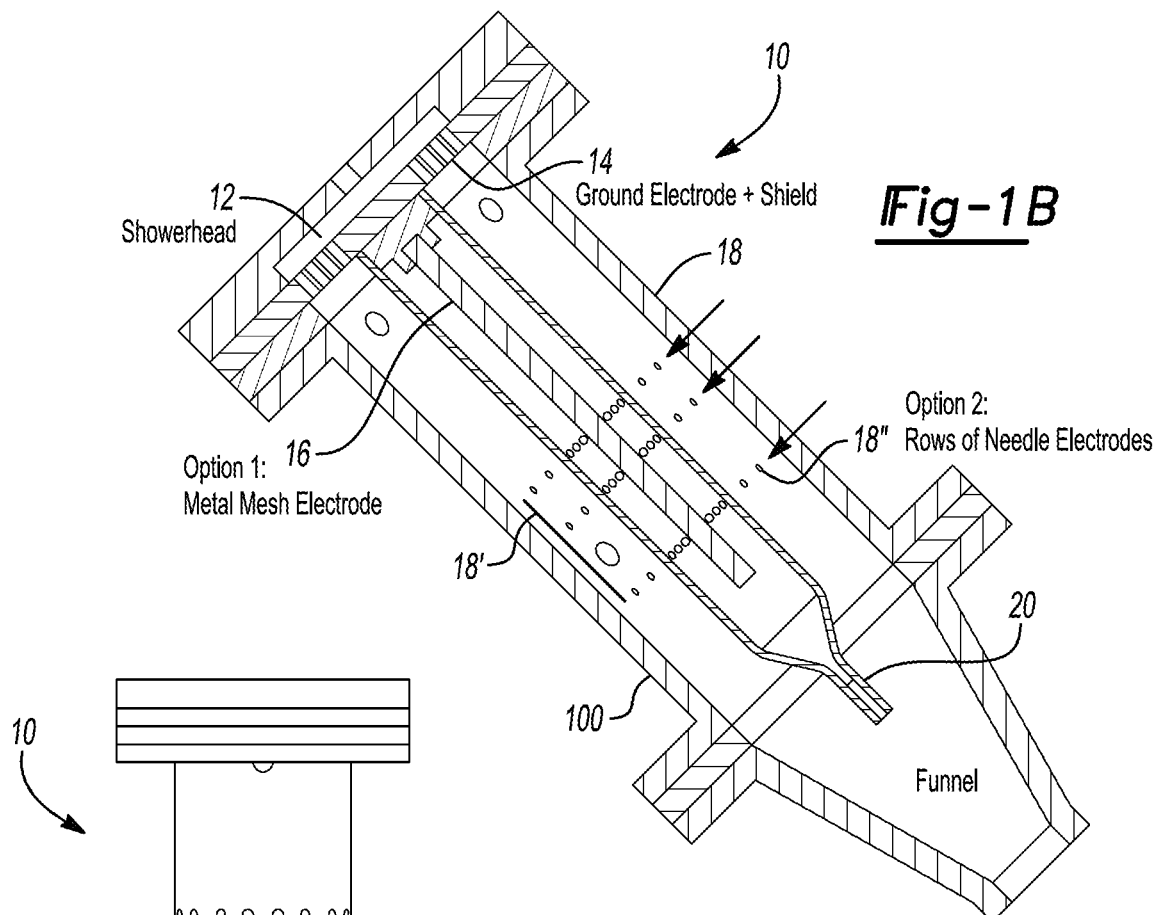
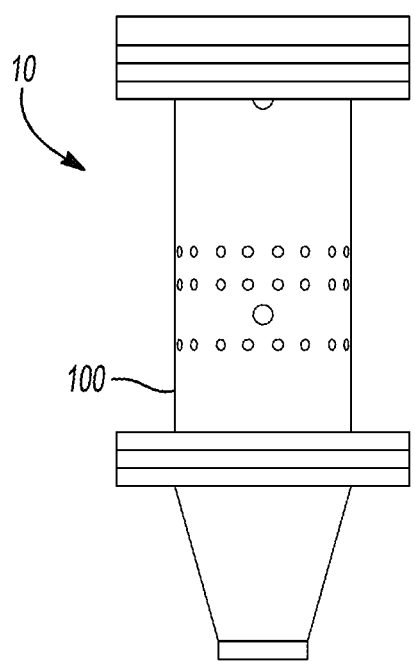
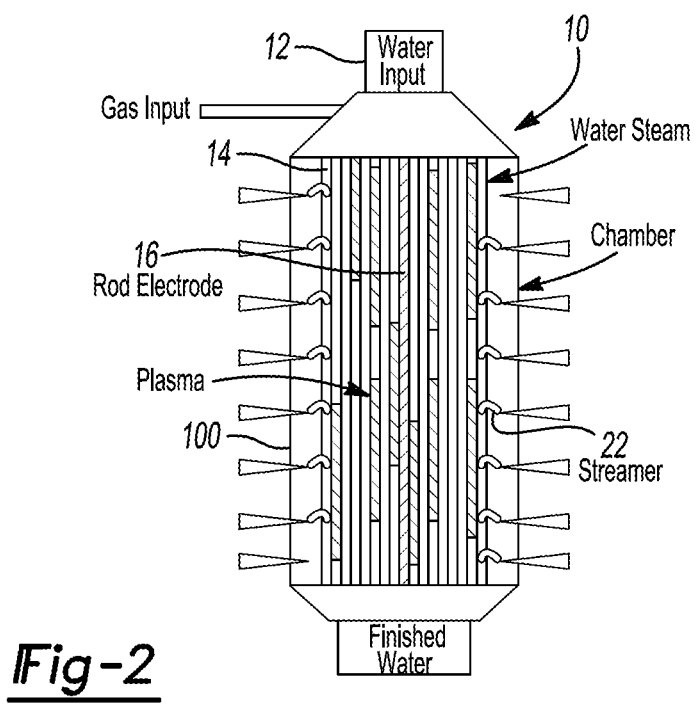
Fig-1B
Fig-1A
Fig-2

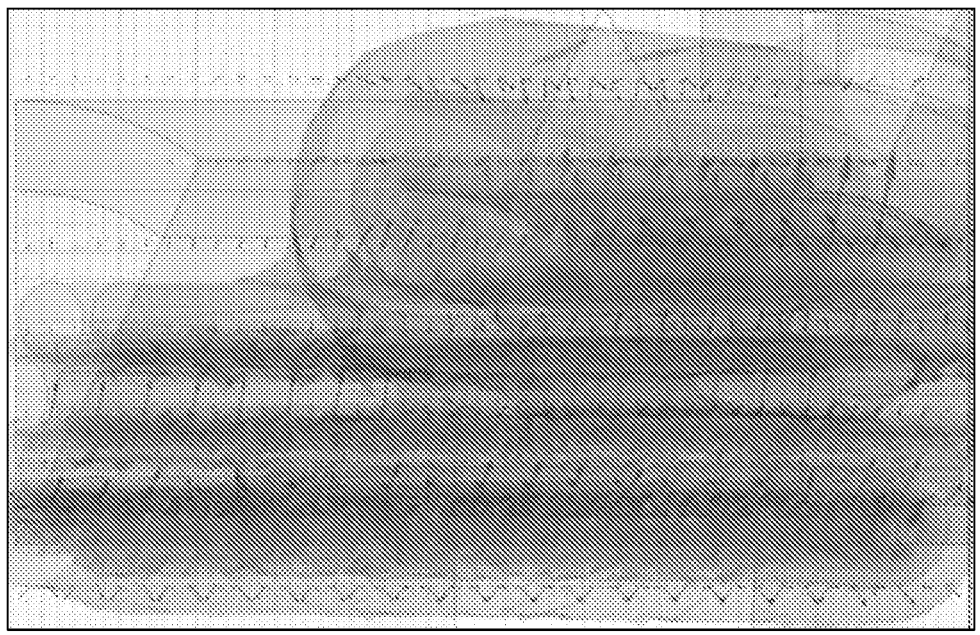
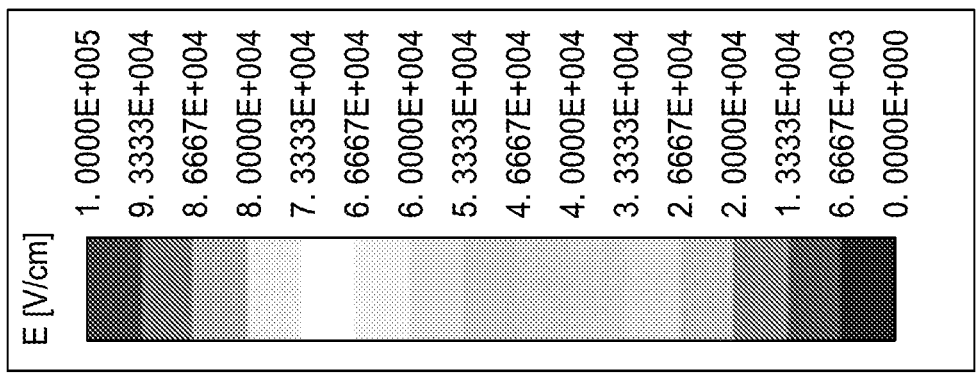
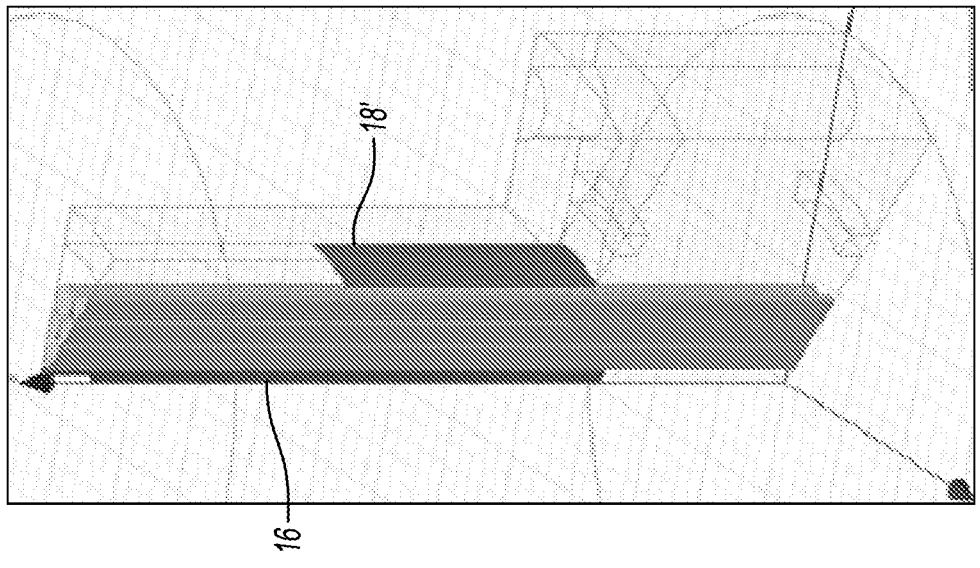
Fig-6B
Fig-6A

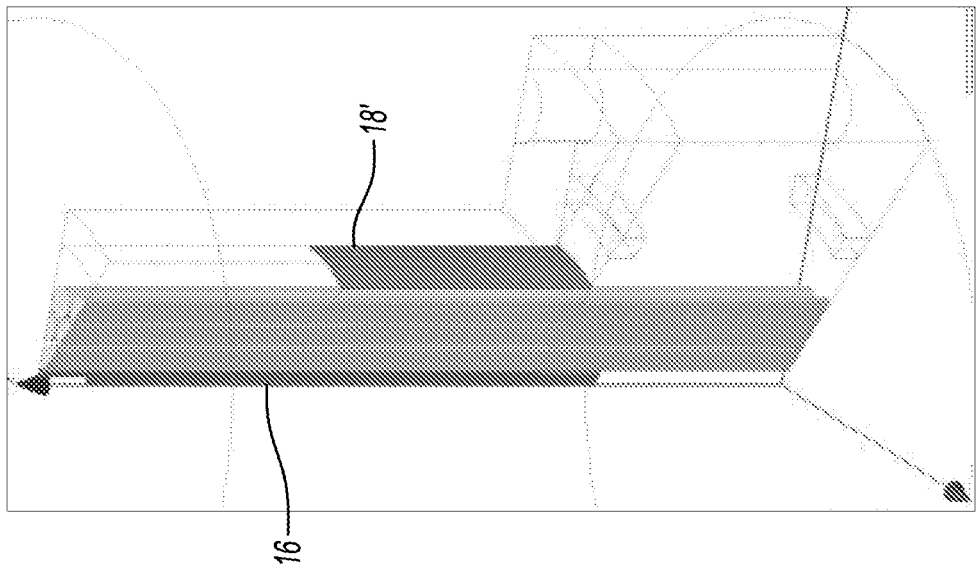
*Fig-7B*
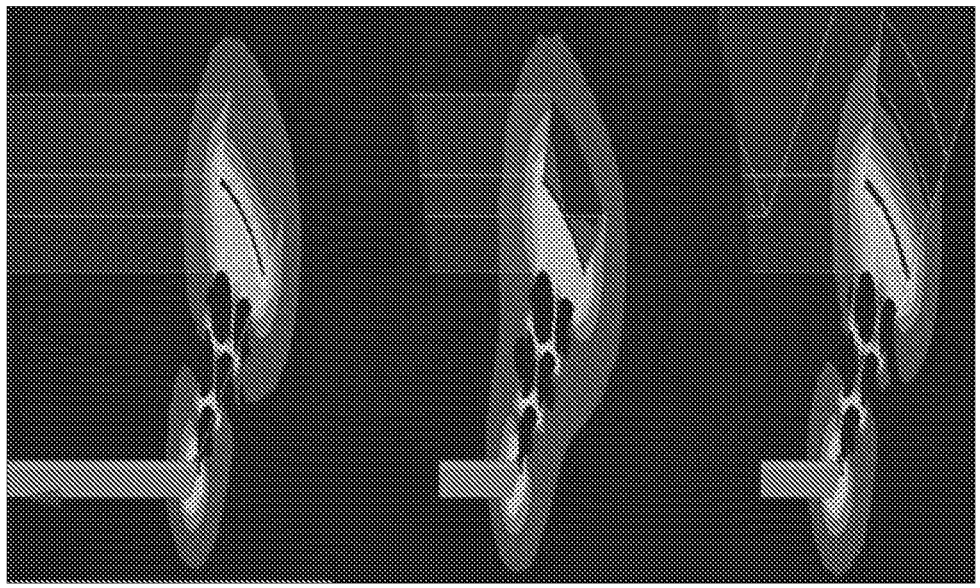
*Fig-7A*
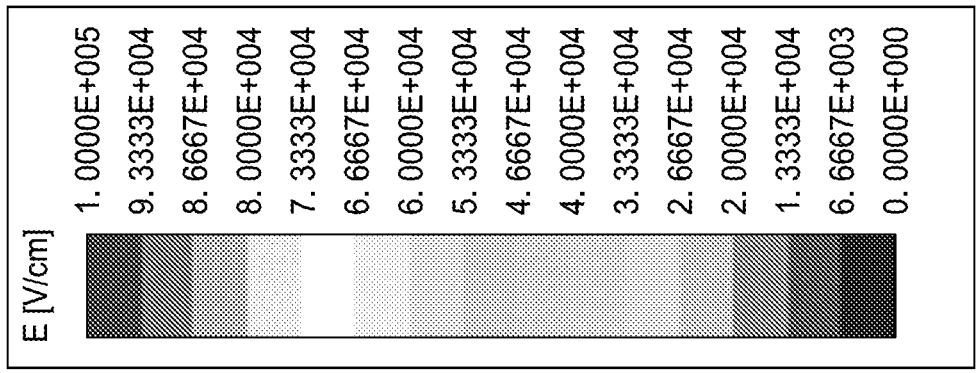

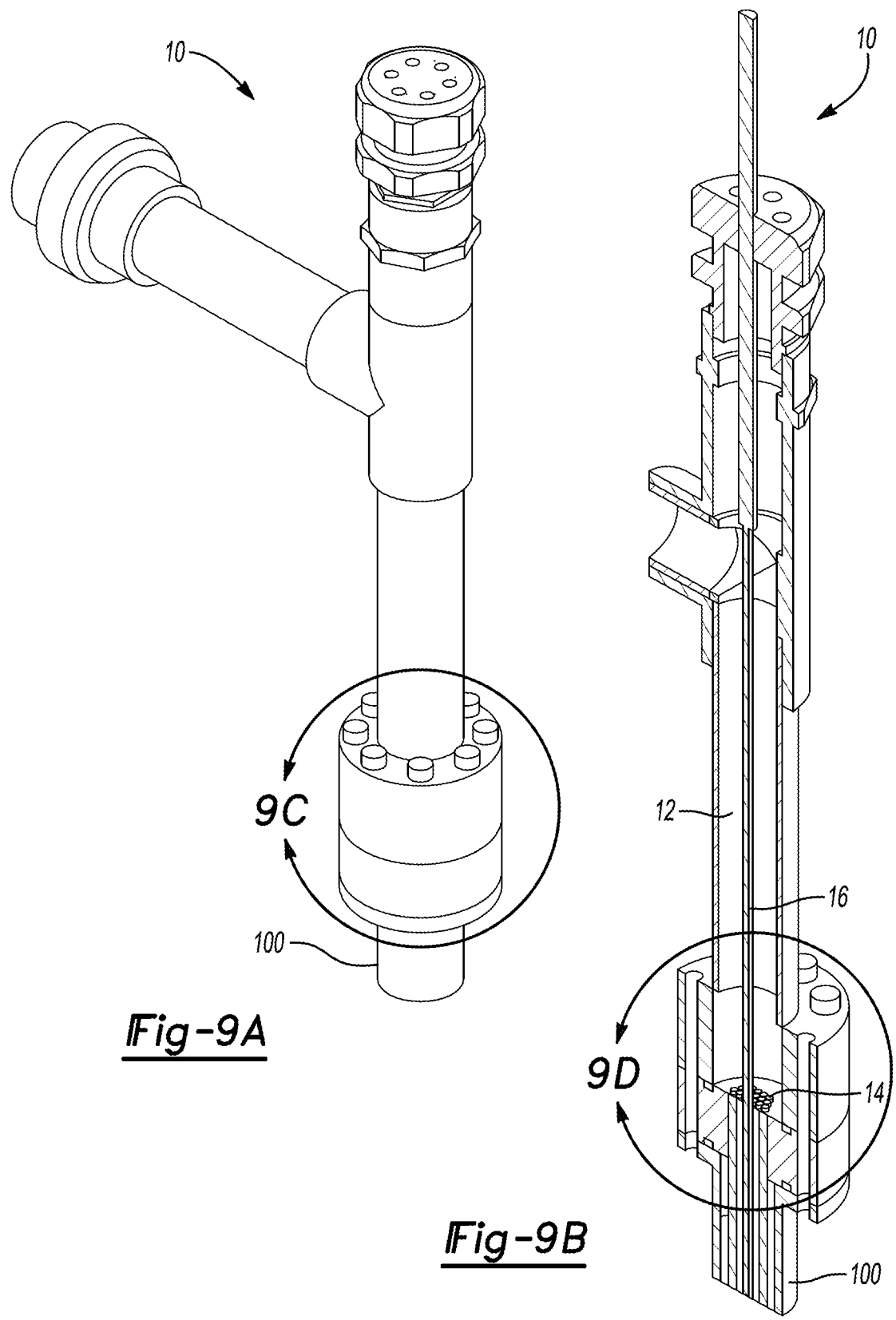

PLASMA WATER PURIFIER HAVING PACKED BED DISCHARGES WITH WATER DIELECTRIC BARRIERS

CROSS-REFERENCE TO RELATED APPLICATIONS

This application is a U.S. National Phase Application under 35 U.S.C. 371 of International Application No. PCT/US2016/034688 filed on Mar. 27, 2016 and published in English as WO 2016/191696 A1 on Dec. 1, 2016. This application claims the benefit of U.S. Provisional Application No. 62/167,589, filed on May 28, 2015. The entire disclosures of the above applications are incorporated herein by reference.

GOVERNMENT INTEREST

This invention was made with government support under CBET1336375, awarded by the National Science Foundation. The Government has certain rights in the invention.

FIELD

The present disclosure relates to a reactor that utilizes plasma (ionized gas) for the purpose of water purification.

BACKGROUND AND SUMMARY

This section provides background information related to the present disclosure which is not necessarily prior art. This section provides a general summary of the disclosure, and is not a comprehensive disclosure of its full scope or all of its features.

Advanced water treatment methods have been the subject of significant research in recent times. Emerging threats from contaminants such as pharmaceuticals, endocrine disruptors, and industrial runoff such as recalcitrant carcinogens (e.g. textile dyes, NDMA, TCE, MTBE, PCBs and 1,4-dioxane) has highlighted the need for advanced treatment methods.

Current water treatment technology relies primarily on filtering and disinfection and in general does not address organic chemical contaminants directly. Indeed, traces of a range of soluble contaminants, though in low concentration, make it to the tap of the end user. In response, current water treatment research focuses on the removal or the safe decomposition of these emerging contaminants. While there is significant interest in bioremediation as a safe method to addressing organic contaminants, the associated long decomposition times suggests that such approaches will have to be supplemented or even replaced using advanced oxidation processes (AOPs).

AOPs involve those methods that generate large amounts of reactive oxygen species, especially the OH radical. The OH radical, though short lived, destroys organic contaminants via a process called mineralization where the final products are typically carbon dioxide, water, and inorganic salts. AOPs can be achieved conventionally. Such methods are energy intensive and require storable precursors such as hydrogen peroxide or ozone.

In recent years, the use of plasma to produce advanced oxidation products in liquid water has been the subject of many investigations. The interaction of plasma with liquid water introduces a host of oxidants in the water, such as OH, ozone, superoxide, peroxide, singlet oxygen, UV light, shock waves/ultrasound, excited nitrogen species, and solvated electrons. The presence of these advanced oxidants attacks not only soluble chemicals, but also bacteria, protozoa, and viruses. Because advance oxidation attacks the structure of these bio contagions, they cannot become immune to plasma treatment. Chlorine resistant microbes can therefore be eliminated using plasma treatments. Additionally plasma based methods can be used as a finishing process to address contaminants arising from emergency releases. The active agents produced in the plasma discharge can easily be produced with air as the feed gas, which eliminates the need for storables, such as oxygen or hydrogen peroxide. Currently, ozonation methods require onsite storage of cryogenic tanks of liquid oxygen and associated infrastructure.

Accordingly, the present teachings provide a reactor system that utilizes plasma (ionized gas) for the purpose of water purification. The plasma produces radicals that oxidize not only organic contaminants but also metal ions. The present teachings are novel in that the implementation accommodates high throughput making them applicable for point of use as well as industrial applications.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A illustrates a side view of a plasma water purifier reactor according to some embodiments of the present teachings.

FIG. 1B illustrates a cross-sectional view of the plasma water purifier reactor according to some embodiments of the present teachings.

FIG. 2 illustrates a cross-sectional view of a plasma water purifier reactor according to some embodiments of the present teachings.

Figure 5:
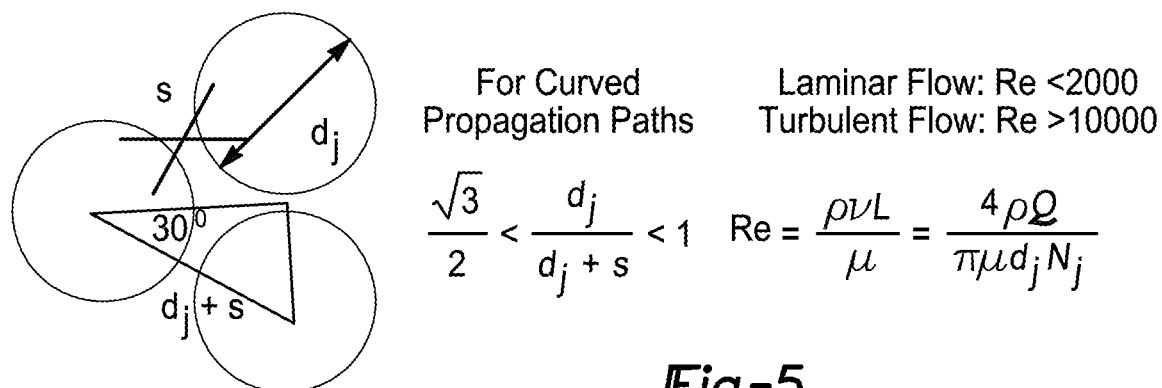

FIG. 5 demonstrates the hexagonal design criteria for packed bed dielectric barrier discharges with water jets.

FIG. 6A illustrates a symmetric slice of a plasma water purifier reactor according to the present teachings without applied voltage.

FIG. 6B illustrates the computed electric field for a symmetric slice of a plasma water purifier reactor according to the present teachings.

FIG. 7A illustrates the magnitude of the electric field at the top, center and bottom of the grounded copper mesh.

FIG. 7B illustrates a symmetric slice of a plasma water purifier reactor according to the present teachings without applied voltage.

Figure 8:

FIG. 8 illustrates the cross section of the magnitude of the electric field at the center of the copper mesh.

FIG. 9A illustrates a perspective view of a plasma water purifier reactor according to some embodiments of the present teachings.

FIG. 9B illustrates a perspective cross-sectional view of the plasma water purifier reactor according to some embodiments of the present teachings.

Figure 9C:
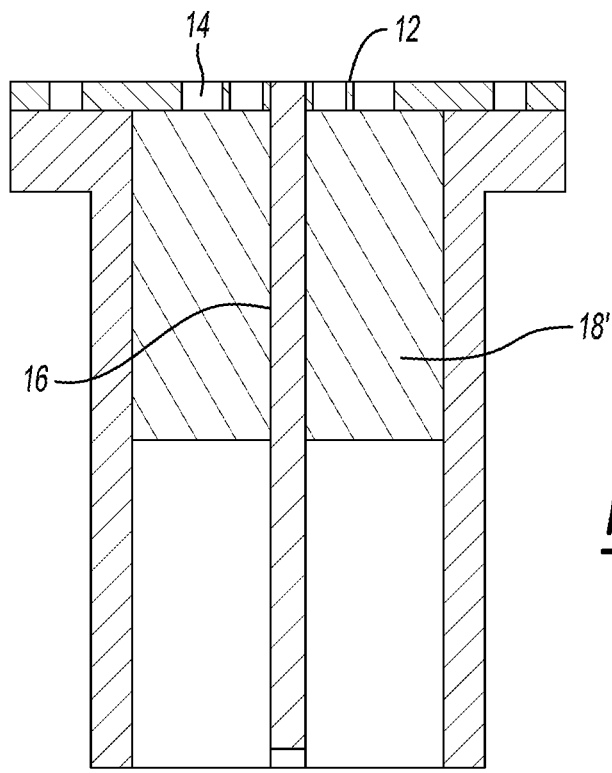

FIG. 9C is a cross-sectional view of an electrode configuration according to some embodiments of the present teachings.

Figure 9D:
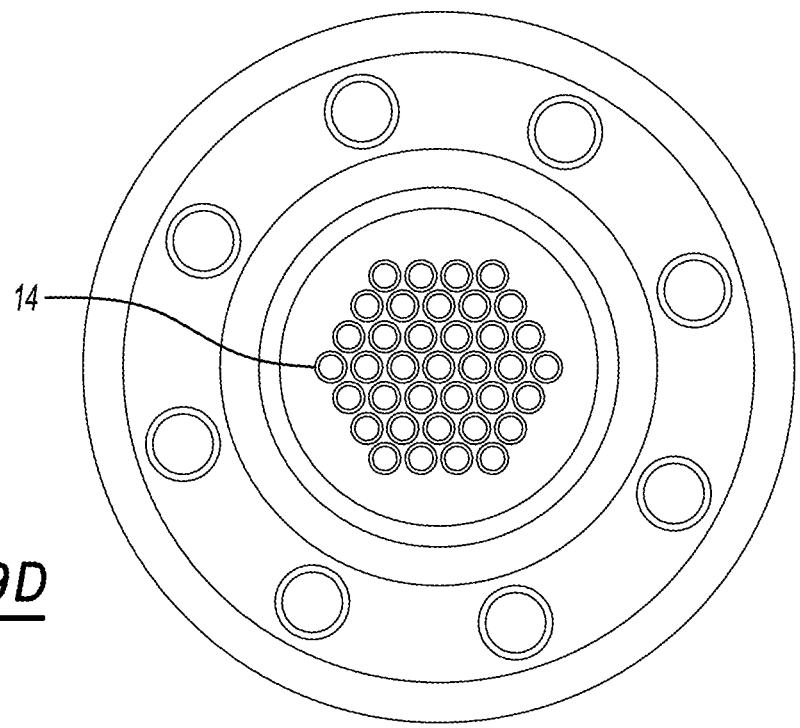

FIG. 9D is an end view of a plate having a plurality of ports for forming water jets or streams according to some embodiments of the present teachings.

Figure 10A:
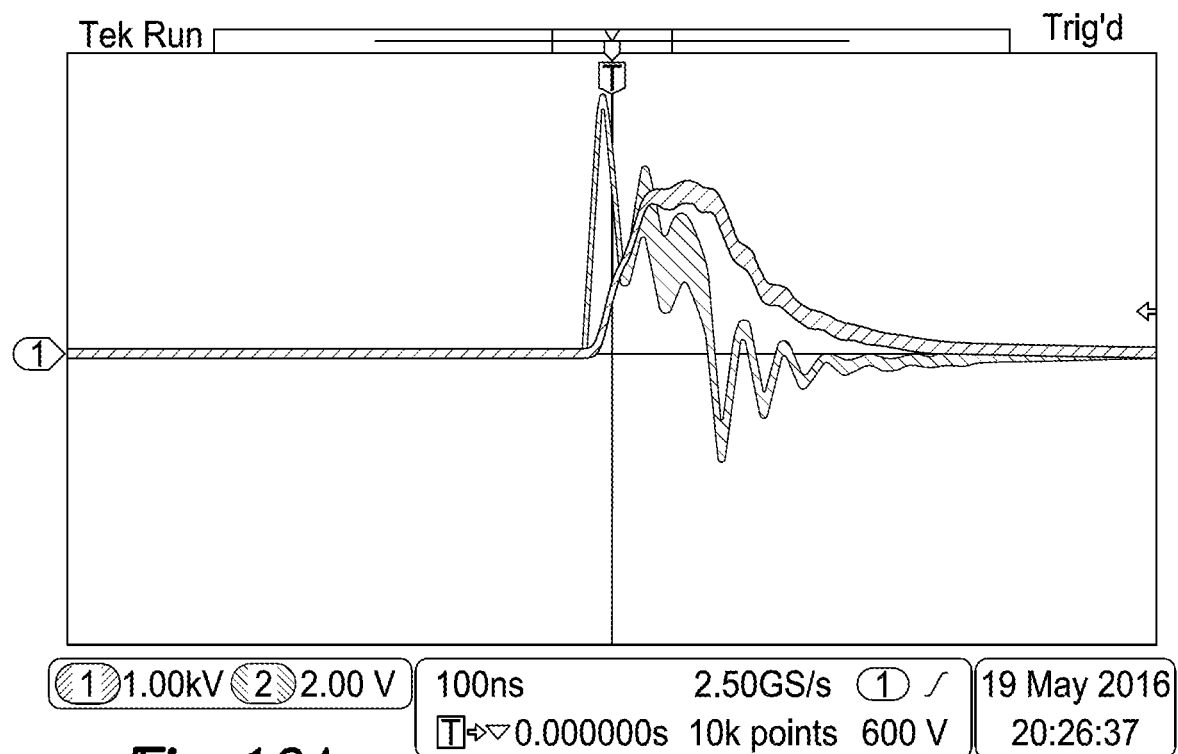
Figure 10B:
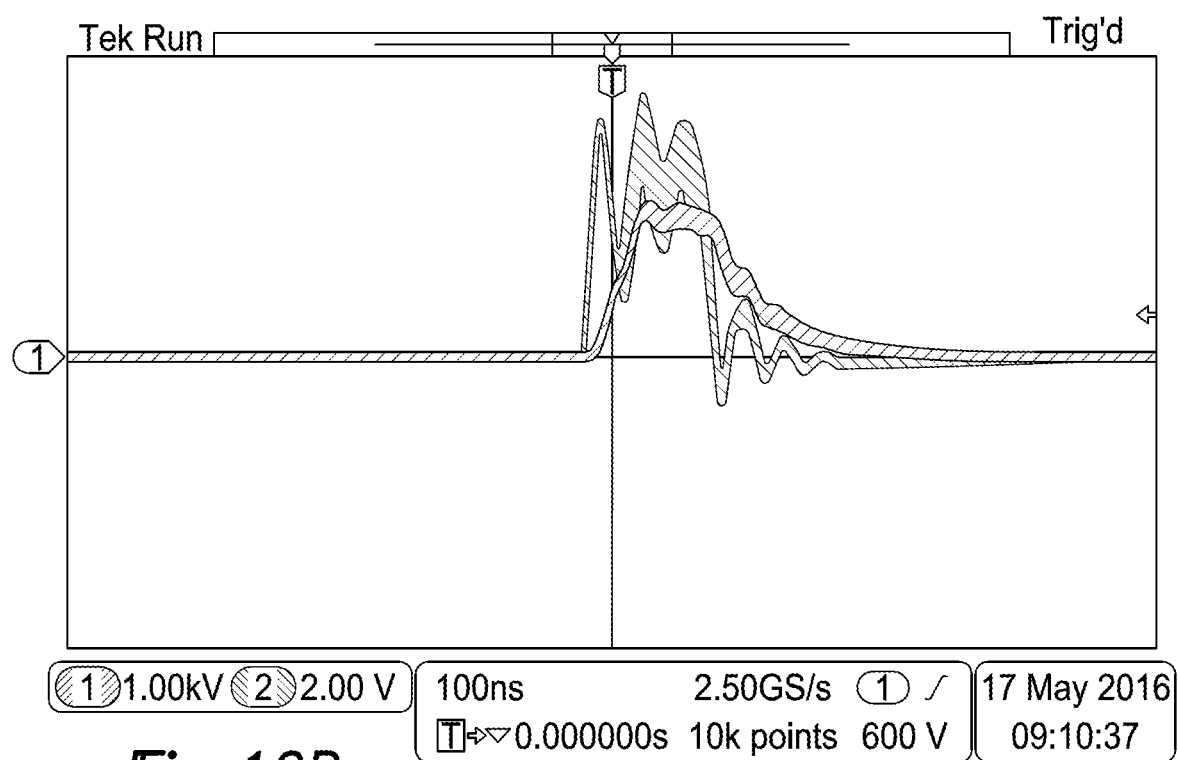

FIG. 10 demonstrates the voltage and current characteristics of various prototypes of the present teachings, wherein FIG. 10A depicts only streamer discharges and FIG. 10B depicts both streamer and packed bed discharges.

Figure 11:
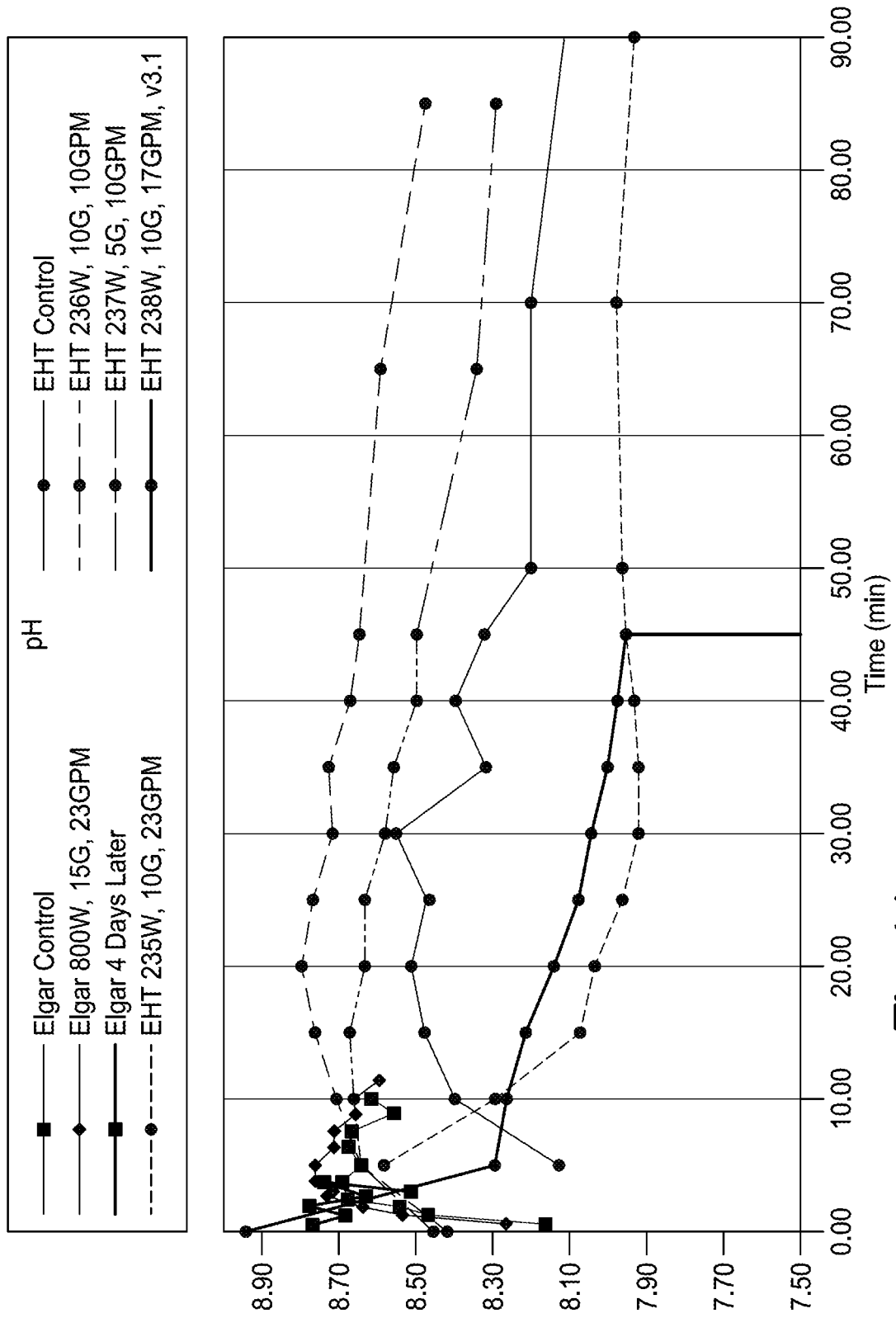

FIG. 11 illustrates the pH changes over time for various flow rates, working volumes, and power supplies.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

While plasma based water decontamination is appealing, conventional system fail to provide sufficient throughput. Laboratory demonstrations of a myriad of plasma discharge embodiments show that it is possible to decompose a host of contaminants. The problem, however, is treatment volume, which tends to be quite small. Additionally, the current approaches are not amenable to high throughput or even flow-through applications as these plasma treatments require the volume of contaminated liquid to be static and exposed to plasma for an extended period of time, typically many minutes, which is not practical for actual applications.

More particularly, current plasma in water or plasma on water surface experiments are not amenable to continuous flow, rather these systems involve plasma injection on the surface of or within the volume of water to be processed. The weakness of the current state of the art lies in the fact that treatment requires long residence times for the water (10 s of minutes) due to minimal propagation of plasma into the water, thus less plasma water interactions. Such processing relies on diffusion from a localized source into the bulk. This issue is circumvented according to the present teachings by breaking up the water into thin streams where plasma treatment is distributed along the stream. The small diameter means that diffusion from the surface into the bulk of an individual stream can actually occur thereby eliminating the need for long residence times. The longer-lived radicals that diffuse into the bulk continue to process contaminants in stream. The high surface area of the jets means that a significant fraction of water to be treated is actually on the surface.

According to some embodiments of the present teachings, as illustrated in the several figures, a plasma water purifier reactor 10 is provided having packed bed discharges with water dielectric barriers. It should be appreciated that although the present teachings will be described in connection with various embodiments, the principles of the present teachings are equally applicable to a wide variety of applications and may comprise a wide variety of configurations and features. Therefore, the present description should not be regarded as limiting the scope of the present teachings and associated claims.

The purpose of plasma water purifier reactor 10, also the primary goal of water reuse, is minimizing energy consumption and maximizing water treatment. The best way to mathematically express this is by EE/O, which is defined as the energy consumed (in kW*h) to remove a given contaminant by an order of magnitude in one cubic meter of water. The current gold standard in water treatment is reverse osmosis (RO) with AOPs involving UV and peroxide to remove organic contaminants. EE/O of RO and AOPs is respectively 3.5 kW*h/m$^3$ and 0.5-3 kW*h/m$^3$. Plasma water purifier reactor 10 targets an EE/O of 0.1 kW*h/m$^3$, which corresponds to 120 Watts per 5 gallons per minute (GPM).

With reference to the figure, plasma water purifier reactor 10 is compatible with once-through schemes, where water is treated as it continuously passes through the module or chamber 100. Generally speaking, as illustrated in FIG. 1B, input water is transformed into extended, thin dielectric barrier layers, between which plasma can form. In this embodiment, water is converted into a series of high surface area to volume streams. Application of a voltage pulse allows plasma to form between dielectric layers according to the principles of packed bed dielectric barrier discharge. The discharge between dielectrics tends to form a surface plasma attachment. The surface plasma attachment on the water streams produces radicals that treat the inner volume of the liquid jet via diffusion. Secondary, longer lived oxidants produced by the plasma-liquid interaction, such as peroxide and ozone, continue to act on the water as it falls toward the collection piping. This configuration is modular and enclosed so that it can actually be pressured with any desired gas, such as but not limited to air, an inert gas, or oxygen, to control the water treatment chemistry. The source can operated with gas injection through the powered electrode or in the main volume. The source can also be operated at reduced pressure. Additionally, because in principal, water is not in contact with the electrodes, metal ions derived from the electrodes won't diffuse into the treated water streams. Moreover, the discharge can be produced with dielectric coated electrodes as well for additional isolation.

More particularly, in some embodiments of the present teaching as illustrated in at least FIGS. 1A, 1B, 2, and 9A-9D, plasma water purifier reactor 10 converts contaminated feed water 12 into a multitude of small diameter jets or streams 14 uniformly centered about one or more centrally-disposed powered electrode 16. The outer boundary of the streams comprises one or more grounded electrodes 18 circumferentially disposed thereabout. In some embodiments, ground electrode 18 can comprise a grounded mesh electrode 18' and/or a periodic array of pin electrodes 18". Both powered electrode 16 and grounded electrode 18 can optionally be covered in a thin, dielectric layer 20 to prevent water stream contamination and electrode corrosion. In some embodiments, the elements of plasma water purifier reactor 10 can be contained or otherwise housing in a chamber or housing 100.

Application of voltage between powered electrode 16 and grounded electrode 18 produces effectively a packed bed barrier discharge. The dielectric barrier—that is, the water-jets or streams 14—prevents arcing within plasma water purifier reactor 10. Discharges are formed in the interstitial spaces between water streams 14 and tend to be short lived, thus maximizing plasma water interactions while minimizing power losses via heating of air or water.

A gas input 30 can be provided to introduce pressurization to the system. As described herein, the pressurization can be achieve via a pressured gas, such as but not limited to air, inert gas, oxygen, and the like.

According to the present principles, plasma is formed in two modes: 1) between water streams 14 and at the surface of the water streams (classic barrier discharge) and 2) via propagation from powered electrode 16 to ground 18—through water streams via streamer 22. These propagation modes expose the surface of the water jets 14 to plasma which generate advanced oxidation radicals, such as OH, peroxide, and ozone, along with UV. These reactive species are produced in the gas phase and at the surface of the liquid. These species destroy contaminants in the water. The use of water streams 14 as a dielectric obstruction and forcing plasma flow and formation between water streams is an important feature of the present teachings. The present teachings accommodate high water throughput by maximizing the surface area to volume ratio of the water jets, which in turn maximizes water exposure to the plasma, hence penetration of the radicals. UV light formed both in the gas phase and on the surface along with longer-lived radicals can also penetrate deep into the thin water jets 14.

In some embodiments, plasma water purifier reactor 10 can comprise a series of concentric cylindrical sheets of water 14. These concentric cylindrical sheets of water are maintained sufficiently thin such that plasma produced radicals completely diffuse into the liquid, thereby treating it. Accordingly, the water serves as a high K dielectric in which breakdown occurs between water layers just as in the case of a packed bed discharge discussed herein. More particularly, surface discharges occur at the surface of the sheets of liquid water. Gas phase plasmas produced products generated between the concentric cylinders drive reactions in the water, thereby treating it. Because water is polar and deformable, the applied electric field can significantly distort the shape of the water jet surface, thereby greatly enhancing the electric field at the surface. The field enhancement intensifies the breakdown and plasma formed there. It is known that high electric fields can destroy bacteria by a process call electroporation where the electric field induces the cell membrane to become porous.

This packed bed dielectric barrier discharge approach can also be applied to water in the solid state, such as ice. Accordingly, plasma formed in the interstitial spaces produce radicals that can react on the surface of the ice. For instance, small ice particles have a relatively large surface area-to-volume ratio and edges or asperities on the ice surface amplify local electric fields, which promotes breakdown.

This general approach may be also implemented using a multiplicity of small bubbles in water, whereby the bubbles essentially form cavities in a dielectric. Plasma is formed in the cavities upon application of a sufficiently high electric field.

The aforementioned embodiments enable high throughput and the potential for low EE/O and high conversion efficiency (the mineralization rate of contaminants in solution divided by the energy cost).

The present teachings provide a system having a wide variety of applications, including but not limited to:

1) point of use water treatment for underdeveloped countries' mobile military applications or other independent water cycles; emergency treatment of water in the case of accidental drinking water contamination;

2) water finishing technology for the removal of soluble organic contaminants, pathogens, and metal ions;

3) water treatment for water reuse in municipal and industrial settings;

4) treatment of wastewater for human spaceflight applications;

5) production of plasma activated water for sterilization application in medical settings; and 6) Drive non-thermal chemical reactions in solution for chemical processing and nutrient and resource recovery.

Similarly, the present teachings provide a number of advantages, including but not limited to:

1) its ability to produce a host of advanced oxidants, such as OH, UV, reactive nitrogen species, ultrasound/shockwaves, ozone, peroxide, and other reactive oxygen species, that can destroy even the most recalcitrant molecules;

2) its ability to produce advanced oxidants that can destroy microbes, bacteria, and viral particles in solution—these species cannot develop an immunity to advanced oxidation as it is a physical process supplemented by other plasma-induced physical, chemical and radiative processes;

3) its ability to be used in point-of-use applications as well as used as a module or stage in a high throughput water treatment plant;

4) its feed gas is air or liquid water vapor so there is no need for storables (to optimize chemistry, other feed gases may also be utilized; system can also be operated at reduced pressure to control plasma production efficiency);

5) radicals produced are short lived and would be absent in finished water product; and 6) its ability to eliminate the need for heavy chlorination and thus would minimize the production of chlorine based purification byproducts (associated with chlorination).

Operation

Figure 3:
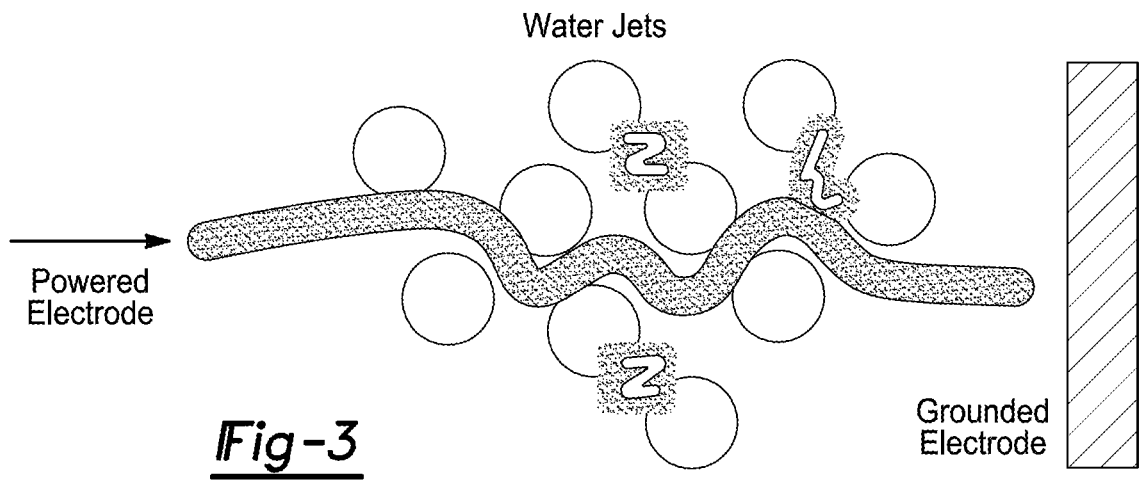
FIG. 3 illustrates two discharge propagation modes in a reactor.
Figure 4:
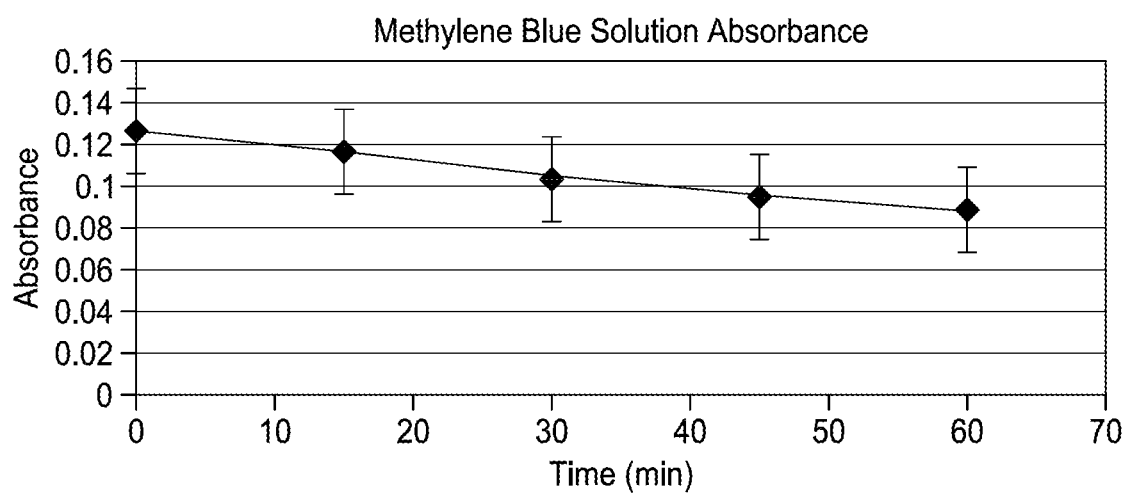
FIG. 4 is a graph illustrating the ability of plasma water purifier reactor to degrade dye concentration.

Proof of concept demonstration of the packed bed with water dielectric plasma reactor was demonstrated subscale, in accordance with FIGS. 1A, 1B, 2, and 9. As described herein, a central electrode 16 is utilized in conjunction with a series of needle electrode rings or concentric copper mesh 18. The discharge can run with either electrode powered. As water flows through the system, the streams pass through a series of breakdown channels that actually form between the water channels so that plasma exposure is distributed, thereby enhancing the exposure time of a given volume of water. Owing to in-house power supply limitation coupled with the large size of the device, only a single electrode stage was used in our first demonstration; that is, only a single ring of needle electrodes was used. The discharge could interact with the water streams via two mechanisms as illustrated in FIG. 3. These include surface discharge initiated between two dielectric surfaces as described previously and by the propagation of plasma streamers through the water channels. Radicals are not only produced in the interstitial spaces, but also at the surface of the water streams where the discharge makes contact. A methylene blue solution was used to illustrate the ability of the first prototype to degrade dye concentration. Limited decomposition with this single stage was observed as can be inferred from the absorbance changes as illustrated in FIG. 4. Since decomposition is proportional to number of stages, one can significantly degrade the dye concentration by simply adding more stages and increasing the input power. Indeed, 100 percent decomposition should be achievable within 4-5 additional stages. It should be pointed out that methylene blue is difficult to decompose by conventional means and is used here only as a demonstration.

Dye decomposition suggests that the approach is capable of decomposing similar or simpler organic contaminants present in potable and non-potable water. Given that decomposition of other trace organics using plasmas is evident in the literature, the approach is promising for industries such as semiconductor, oil & gas, textile, pharmaceutical, and food & beverage.

To enhance the packed bed phenomena with water streams, the design demands consistent and closely spaced water jets. For starters, a hexagonal model is used to ensure uniform packed bed dielectric barrier discharges but others, such as the golden ratio scheme, can be applied. As shown in FIG. 5, three adjacent water jets are considered closely spaced when the packing factor is in between 0.866 and 1 where $d_j$ is the water jet diameter and s is the interstitial spacing. This encourages the likelihood of interstitial discharges and enforces streamers to navigate along the surface of the water streams, hence maximizing plasma water interactions.

Since the gaseous radicals need time to diffuse into the water, there is ultimately a relationship between the disinfection rate, type of flow, water jet velocity, and diameter. This can be expressed by the Reynolds number, Re, where $N_j$ is the number of water jets, Q is the flow rate, and $\rho$ and $\mu$ are respectively the density and viscosity of water. Laminar flow, or Re<2000, is favored but low velocities can result in inconsistent water streams, water coating the electrode, and lower flow rates, which reduce the efficiency. On the other hand, the water jets will exhibit consistent behavior on a short length scale for very turbulent flows, or Re>>10000, which can be achieved with the available pump, power and other supplies. However, in order to maintain sufficient radical penetration into the water at higher velocities, once through treatment requires a higher frequency of plasma pulses, thus higher power.

Based on the above criteria, material availability and precision limitations (especially machining interstitial spacing in acrylic), $d_j$, s and $N_j$ were respectively selected to be 7/64 inch, 0.3 mm and 36. Even thinner water jets are preferred due to the small penetration depths of the various radicals but thinner jets are not necessary since they require a smaller interstitial spacing and can have the same effect as several modules in series. Based on the hexagonal water jet pattern, less water jets are also preferred in order to sustain both streamer and packed bed discharges for target flow types and rates. This is true for that design because if any given radial propagation path increases by one water jet, the overall system diameter has to increase drastically. For instance, a single water jet in between the center electrode and outer mesh demands a total of 6 jets; for two adjacent jets between the electrodes, the total of jets required is 18. The number of water streams was selected to be 36 since it would demonstrate significant pack bed phenomena and allow for high throughput.

Although others can be used, the Eagle Harbor Technologies nanosecond pulser was the favored power supply since short duration yet high voltage pulses are the most efficient for packed bed dielectric barrier discharges. Using their 120 W power supply and maxing out the voltage knob to 20 kV, the optimal pulse width and repetition frequency were respectively determined to be 120 ns and 4 kHz. Significant deviation from this pulse width and frequency corresponded to a notable drop in plasma intensity.

For successful electrical breakdown at atmospheric pressures, the electric field must be greater than 30 kV/cm, also known as the Meeks criterion. Consequently, the Meeks criterion must be met throughout plasma water purifier reactor 10, which is valid when 20 kV is applied to a symmetric slice, as demonstrated in FIGS. 6A, 6B, 7A, 7B, and 8.

As exhibited in FIGS. 9A-9D, the system can be gas injected and powered from above. By way of example, the system can comprise a $d_j$ of 1/8 inch, s of 0.3 mm, and $N_j$ of 18. FIGS. 10A-10B illustrates the waveforms of various prototypes. FIG. 10B depicts the increase in the secondary and tertiary current spikes associated with the embodiment of FIGS. 9A-9D, thereby indicating greater power deposition and more packed bed discharges.

As mentioned earlier, varying water flow type and rate will affect the plasma chemistry. For instance, in a closed water treatment loop, different working volumes and flow rates resulted in a wide range of pH changes for the Elgar and Eagle Harbor Technologies power supplies, as shown in FIG. 11. Although they can be application specific, the flow rates and working volumes respectively ranged from 5 to 25 GPM and from 5 to 15 gallons. The ultimate goal is to have these flow rates for once through treatment but the many loops provide insight into the decomposition efficiency and kinetics of various organic contaminants. Although methylene blue dye decomposition was expressed for the first prototype before packed bed discharges were evident, the removal of various trace organics with the latest reactor is provided herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for water purification, said system comprising:
   a chamber;
   a water inlet being distributed into a plurality of water streams within the chamber, each of the plurality of water streams defines a dielectric barrier layer with a high surface area to volume ratio, each of the plurality of water streams being separate thereby defining interstitial spaces there between;
   a gas inlet receiving a gas within the chamber; and
   a plasma system having a powered electrode and a ground electrode disposed within the chamber responsive to an applied voltage, the plasma system configured to receive the gas from the gas inlet and output a plasma within the interstitial spaces between each of the plurality of water streams, at the surface of each of the plurality of water streams, and within each of the plurality of water streams via propagation forming at least a surface plasma attachment producing reactive species that purify the water.

2. The system according to claim 1, wherein the powered electrode and a ground electrode are physically isolated from the water and thus cannot erode and contaminate the water under treatment.

3. The system according to claim 2, wherein at least one of the powered electrode and the ground electrode comprises a dielectric coating.

4. The system according to claim 1 wherein the plasma is produced via packed bed dielectric barrier discharge that forms within the interstitial spaces between each of the plurality of water streams.

5. The system according to claim 1 wherein the plasma is produced via streamer discharge that propagates from the powered electrode through the dielectric barrier layers producing the reactive species.

6. The system according to claim 1 wherein the is chosen from the group consisting of air, oxygen, and inert gas.

7. The system according to claim 1 wherein the plasma system is configured to deform the water in response to the applied voltage, thereby locally enhancing an electric field at the water surface.

8. The system according to claim 1 is modular.

9. The system according to claim 1, wherein the plasma system is configured such that secondary oxidants produced as a result of the plasma act upon the water following application of the plasma.

10. The system according to claim 1, wherein the ground electrode comprises one or more ground electrodes circumferentially surrounding the plurality of water streams.

11. The system according to claim 10, wherein the one or more ground electrodes comprises a grounded mesh.

12. The system according to claim 10, wherein the one or more ground electrodes comprises a periodic array of pin electrodes.

13. The system according to claim 1, wherein the powered electrode comprises one or more powered electrodes circumferentially surrounding the plurality of water streams.

14. The system according to claim 13, wherein the one or more powered electrodes comprises a powered mesh.

15. The system according to claim 13, wherein the one or more powered electrodes comprises a periodic array of pin electrodes.

16. The system according to claim 1, wherein at least one of the powered electrode and the ground electrode is centrally disposed within the chamber.

17. The system according to claim 1, wherein the plurality of water streams circumferentially surrounds at least one of the powered electrode and the ground electrode.

18. The system according to claim 1, wherein each of the plurality of water streams comprises a water sheet, the plurality of water sheets circumferentially surrounding the powered electrode.

* * * * *